US012695507B2

(12) United States Patent
Wu et al.

(10) Patent No.: US 12,695,507 B2
(45) Date of Patent: Jul. 28, 2026

(54) EQUALIZATION APPARATUS, OPTICAL TRANSMISSION SYSTEM, AND EQUALIZATION METHOD

(71) Applicant: NEC Corporation, Tokyo (JP)

(72) Inventors: Mingqi Wu, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 18/570,182

(22) PCT Filed: Jan. 24, 2022

(86) PCT No.: PCT/JP2022/002326
§ 371 (c)(1),
(2) Date: Dec. 14, 2023

(87) PCT Pub. No.: WO2022/264474
PCT Pub. Date: Dec. 22, 2022

(65) Prior Publication Data
US 2024/0146437 A1     May 2, 2024

(30) Foreign Application Priority Data

Jun. 15, 2021     (WO) ................. PCT/JP2021/022600

(51) Int. Cl.
*H04B 10/07*         (2013.01)
*H04B 10/079*        (2013.01)
(Continued)

(52) U.S. Cl.
CPC ... *H04B 10/07953* (2013.01); *H04B 10/2581* (2013.01); *H04B 10/516* (2013.01);
(Continued)

(58) Field of Classification Search
CPC .......... H04B 10/07953; H04B 10/2581; H04B 10/516; H04B 10/07; H04B 10/079;
(Continued)

(56) References Cited

U.S. PATENT DOCUMENTS 7,756,421 B2 *   7/2010   Roberts .............. H04B 10/2543
                                                              398/158
11,032,119 B2    6/2021   Ma et al.
(Continued)

FOREIGN PATENT DOCUMENTS

| JP | 2004-072759 A | 3/2004 |
| JP | 2018-113566 A | 7/2018 |
| JP | 2020-113902 A | 7/2020 |

OTHER PUBLICATIONS

International Search Report for PCT Application No. PCT/JP2022/002326, mailed on Apr. 26, 2022.
(Continued)

*Primary Examiner* — Dibson J Sanchez
(74) *Attorney, Agent, or Firm* — Sughrue Mion, PLLC

(57)          ABSTRACT
A penalty is introduced to the channel with less noise when the difference in the transmitted signal quality among channels is reduced; therefore, an equalization apparatus according to an exemplary aspect of the disclosure includes a processing means for performing a process associated with a signal using a transfer function with a coefficient, the signal propagating through each of a plurality of channels; and a coefficient generating means for generating the coefficient based on channel quality information on each of the plurality of channels.

6 Claims, 11 Drawing Sheets

(51) Int. Cl.

| | |
|---|---|
| *H04B 10/2581* | (2013.01) |
| *H04B 10/516* | (2013.01) |
| *H04J 14/02* | (2006.01) |
| *H04B 10/50* | (2013.01) |
| *H04J 14/00* | (2006.01) |
| *H04J 14/04* | (2006.01) |

(52) U.S. Cl.
CPC .............. *H04J 14/00* (2013.01); *H04J 14/02* (2013.01); *H04B 10/07* (2013.01); *H04B 10/079* (2013.01); *H04B 10/0795* (2013.01); *H04B 10/50* (2013.01); *H04B 10/5057* (2013.01); *H04J 14/04* (2013.01); *H04J 14/052* (2023.08)

(58) Field of Classification Search
CPC ................ H04B 10/0795; H04B 10/50; H04B 10/5057; H04J 14/02; H04J 14/00; H04J 14/04; H04J 14/052
USPC .......................... 398/9–38, 43–103, 182–201
See application file for complete search history.

(56) References Cited

U.S. PATENT DOCUMENTS

| | | | | |
|---|---|---|---|---|
| 11,736,202 | B2 * | 8/2023 | Yamanaka ........... | H04B 10/614 |
| | | | | 359/341.41 |
| 2015/0037034 | A1 * | 2/2015 | Renaudier ........... | H04L 25/0288 |
| | | | | 398/79 |
| 2015/0086199 | A1 | 3/2015 | Ryf et al. | |
| 2015/0103751 | A1 | 4/2015 | Afkhami et al. | |
| 2016/0273915 | A1 | 9/2016 | Kitamura et al. | |
| 2016/0277118 | A1 * | 9/2016 | Châtelain ......... | H04B 10/25073 |

| | | | | |
|---|---|---|---|---|
| 2017/0244489 | A1 * | 8/2017 | Zhuge ................ | H04B 10/5561 |
| 2018/0109318 | A1 * | 4/2018 | Castro ................ | H04B 10/2513 |
| 2018/0375607 | A1 * | 12/2018 | Shibahara ............. | H04L 25/067 |
| 2020/0036440 | A1 * | 1/2020 | Yamagishi ............. | H04B 10/61 |
| 2020/0036446 | A1 * | 1/2020 | Ge ........................ | H04B 10/075 |
| 2020/0228228 | A1 * | 7/2020 | Oyama ............... | H04L 25/4919 |
| 2020/0244369 | A1 * | 7/2020 | Yamamoto .......... | H04J 14/0305 |
| 2021/0328666 | A1 * | 10/2021 | Yamagishi ......... | H04B 10/6162 |
| 2022/0029707 | A1 * | 1/2022 | Nakamura .............. | H04L 27/26 |
| 2022/0069921 | A1 * | 3/2022 | Masuda ............. | H04B 10/6971 |
| 2022/0216923 | A1 * | 7/2022 | Matsushita .......... | H04B 10/077 |
| 2024/0146420 | A1 * | 5/2024 | Nakamura ........... | H04B 10/541 |

OTHER PUBLICATIONS

Written opinion for PCT Application No. PCT/JP2022/002326, mailed on Apr. 26, 2022.

Takahashi et al., "Vector-based equalization method to mitigate core-to-core Q-difference for space-division multiplexing transmission", 2017 OECC and PGC, Jul. 31, 2017, pp. 1-2.

Takahashi et al., "Channel Number Dependency of Vector-Domain Signal Quality Equalization to Mitigate Core-to-Core Q-difference", 2018 23rd OECC, Jul. 2, 2018, pp. 1-2.

Takahashi et al., "Experimental Evaluation of Channel Number Dependency in Vector-Domain Signal Quality Equalization to Mitigate Core-to-Core Q-differnce for SDM Transmission", 2018 OECC, Sep. 23, 2018, pp. 1-2.

Takahashi et al., "Experimental Demonstration of Signal Quality Equalization inVector Domain to Mitigate Core-to-Core Q-difference for SDM Transmission", 2017 ECOC, Apr. 26, 2018, pp. 1-3.

JP Office Communication for JP Application No. 2023-577443, mailed on Apr. 22, 2025 with English Translation.

US Office Action for U.S. Appl. No. 18/570,128, mailed on Mar. 10, 2026.

\* cited by examiner

TRANSMITTING
PROCESSING UNIT

RECEIVING PROCESSING
UNIT

COEFFICIENT
GENERATING UNIT

120

EQUALIZATION APPARATUS, OPTICAL TRANSMISSION SYSTEM, AND EQUALIZATION METHOD

TECHNICAL FIELD

This application is a National Stage Entry of PCT/JP2022/002326 filed on Jan. 24, 2022, which claims priority from PCT International Application PCT/JP2021/022600 filed on Jun. 15, 2021, the contents of all of which are incorporated herein by reference, in their entirety.

The present disclosure relates to equalization apparatuses, optical transmission systems, and equalization methods, in particular, to an equalization apparatus, an optical transmission system, and an equalization method that are used in wavelength division multiplexing systems.

BACKGROUND ART

In order to meet the demand for higher communication capacity in the optical fiber transmission, technological development leads to development of multiplexing techniques in many perspectives of resources such as wavelength division multiplexing (WDM) and space division multiplexing (SDM).

When multiplexing technique is applied, signals are simultaneously transmitted in multiple channels such as multiple cores in a multiple-core fiber (MCF) in the SDM. In particular, for uncoupled MCF, Q-factor difference among channels occurs depending on the individual loss and the gain at each core as well as other multi-channel components. Further, Q-factor difference increases more due to the noise figure and gain control of Erbium-Doped Fiber Amplifier (EDFA) in long distance transmission system such as submarine transmission. The aforementioned Q-factor difference becomes a bottleneck to overall transmission capacity. Therefore, it is required to equalize the Q-factor difference between channels in the multiplexing transmission.

Patent Literature 1 (PTL 1) describes a transmitter that is capable of eliminating the Q-factor differences among channels in SDM. Two channels of data are equally separated and mixed by a 2×2 matrix at the transmitter side. Received signals are then restored by the inverse matrix of 2×2 matrix. Therefore, each restored signal suffers an average of the channel noise. As a result, the Q-factor differences between two channels are equalized.

CITATION LIST

Patent Literature

PTL 1: Japanese Unexamined Patent Application Publication No. 2018-113566

SUMMARY OF INVENTION

Technical Problem

Although the related transmitter disclosed in Patent Literature 1 can reduce, at a certain level, the difference in the transmitted signal quality due to two channel differences, the related transmitter introduces a penalty to the channel which has originally less noise. This is because the transfer matrix used in the related transmitter is designed to equally mix two channels of signals together regardless of the channel condition. Accordingly, a penalty is introduced to the channel which has originally less noise, which results in extra performance degradation of the whole multiplexed transmission system during this equalization procedure.

An exemplary object of the present disclosure is to provide an equalization apparatus, an optical transmission system, and an equalization method that solve the aforementioned problem that a penalty is introduced to the channel with less noise when the difference in the transmitted signal quality among channels is reduced.

Solution to Problem

An equalization apparatus according to an exemplary aspect of the disclosure includes a processing means for performing a process associated with a signal using a transfer function with a coefficient, the signal propagating through each of a plurality of channels; and a coefficient generating means for generating the coefficient based on channel quality information on each of the plurality of channels.

An optical transmission system according to an exemplary aspect of the disclosure includes a transmitting processing means for receiving input of data to be transmitted through a plurality of channels, and converting the data into a signal using a first transfer matrix with a coefficient in such a way as to give more signal power to a channel with lower channel quality; a receiving processing means for receiving input of the signal after propagating through the plurality of channels, and restoring the signal after the propagating to the data using a second transfer matrix that is an inverse matrix of the first transfer matrix; and a coefficient generating means for generating the coefficient based on channel quality information on each of the plurality of channels.

An equalization method according to an exemplary aspect of the disclosure includes performing a process associated with a signal using a transfer function with a coefficient, the signal propagating through each of a plurality of channels; and generating the coefficient based on channel quality information on each of the plurality of channels.

Advantageous Effects of Invention

An exemplary advantage according to the present disclosure is that it is possible to equalize the difference in the transmitted signal quality among channels with a minimum penalty.

BRIEF DESCRIPTION OF DRAWINGS

FIG. 1 is a block diagram illustrating the configuration of an equalization apparatus in accordance with a first example embodiment of the present disclosure.

DESCRIPTION OF EMBODIMENTS

Figure 2:
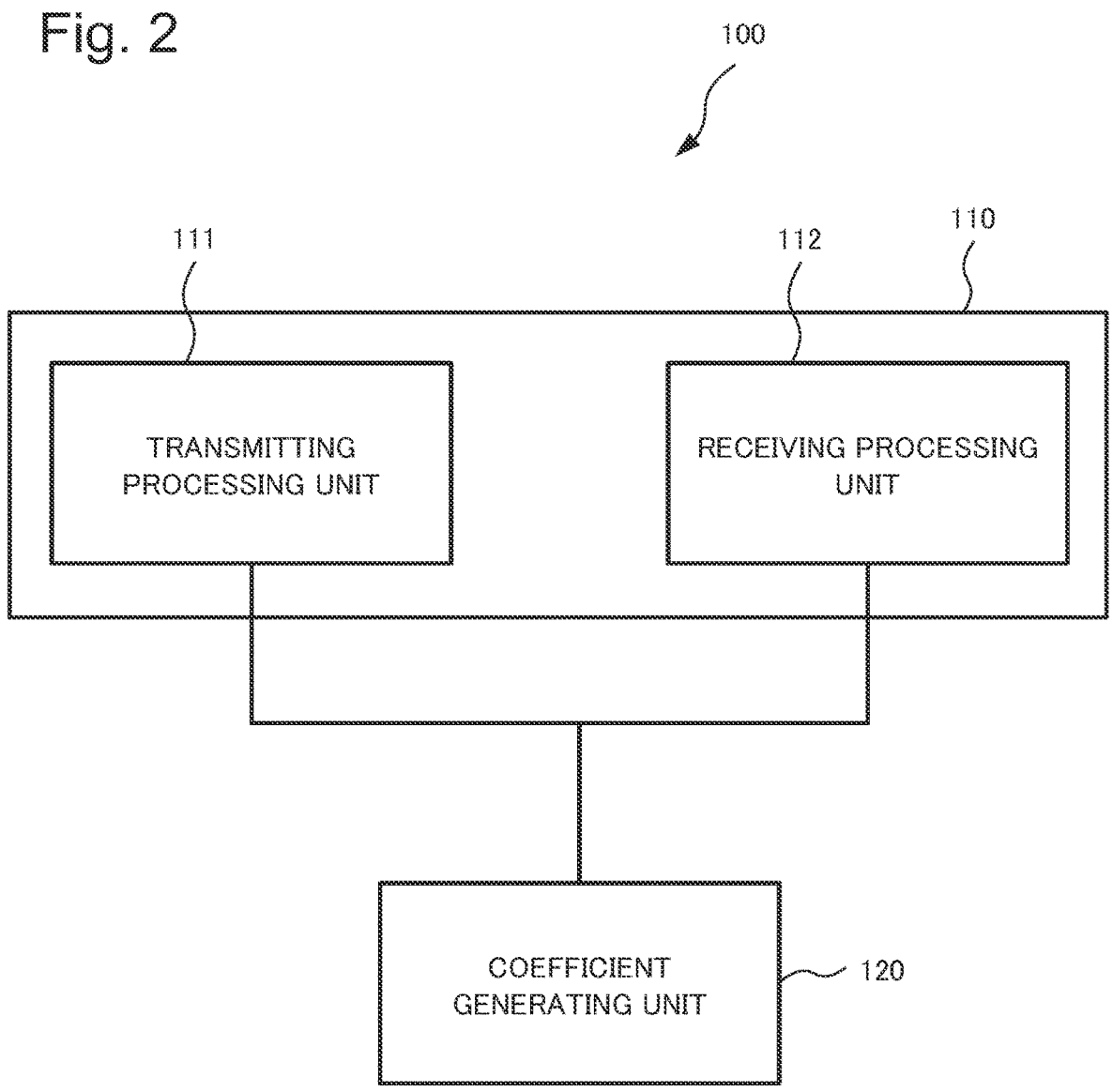
FIG. 2 is a block diagram illustrating another configuration of an equalization apparatus in accordance with a first example embodiment of the present disclosure.

The example embodiments of the present disclosure will be described with reference to drawings below. The arrow direction in the drawings denotes an example of direction and does not limit the direction of signals between blocks.

A First Example Embodiment

Figure 1:
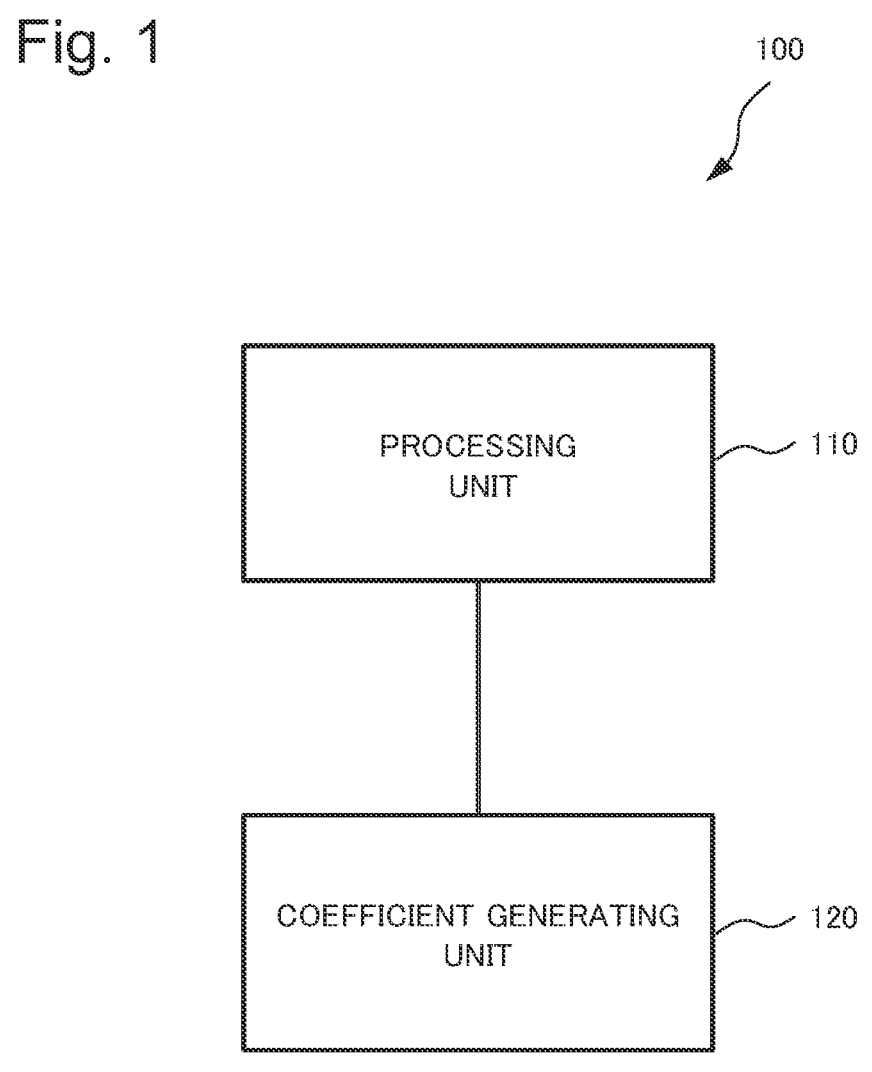

FIG. 1 is a block diagram illustrating the configuration of an equalization apparatus in accordance with a first example embodiment of the present disclosure. The equalization apparatus 100 includes a processing unit (a processing means) 110 and a coefficient generating unit (a coefficient generating means) 120.

The processing unit 110 is configured to perform a process associated with a signal using a transfer function with a coefficient. The signal is to propagate through each of a plurality of channels. The coefficient generating unit 120 is configured to generate the coefficient based on channel quality information on each of the plurality of channels.

According to the equalization apparatus 100 of the present example embodiment, it is possible to equalize the difference in the transmitted signal quality among channels with a minimum penalty, because the process associated with the signal is performed based on channel quality information on each of the plurality of channels.

As illustrated in FIG. 2, the processing unit 110 may include a transmitting processing unit (a transmitting processing means) 111. The transmitting processing unit 111 is configured to receive input of data to be transmitted through the plurality of channels, and convert the data into the signal using a first transfer matrix as the transfer function in such a way as to give more signal power to a channel with lower channel quality.

In addition, the processing unit 110 may include a receiving processing unit (a receiving processing means) 112. The receiving processing unit 112 is configured to receive input of the signal after propagating through the plurality of channels, and restore the signal after the propagating to the data using a second transfer matrix as the transfer function. The second transfer matrix is an inverse matrix of the first transfer matrix.

The transfer function may include a square matrix having a same number of columns as a number of the plurality of channels. The square matrix is expressed as an element-wise product of a coefficient matrix and an orthogonal matrix. The coefficient generating unit 120 is configured to determine matrix elements of the coefficient matrix.

The channel quality information includes one of a noise power level, a signal to noise ratio (SNR), and a bit error rate (BER), with regard to each of the plurality of channels.

The plurality of channels are different cores of a multi-core fiber (MCF) through which the signal propagates. Alternatively, the plurality of channels are different wavelengths in a wavelength division multiplexing on which the signal propagates.

Next, an equalization method in accordance with the present example embodiment will be described.

In the equalization method, first, a process associated with a signal using a transfer function with a coefficient is performed. The signal is to propagate through each of a plurality of channels. And, the coefficient is generated based on channel quality information on each of the plurality of channels.

The performing of the process associated with the signal may include receiving input of data to be transmitted through the plurality of channels, and converting the data into the signal using a first transfer matrix as the transfer function in such a way as to give more signal power to a channel with lower channel quality.

The performing of the process associated with the signal may also include receiving input of the signal after propagating through the plurality of channels, and restoring the signal after the propagating to the data using a second transfer matrix as the transfer function. The second transfer matrix is an inverse matrix of the first transfer matrix.

In the equalization method, the transfer function may include a square matrix having a same number of columns as a number of the plurality of channels. The square matrix is expressed as an element-wise product of a coefficient matrix and an orthogonal matrix.

In the equalization method, the channel quality information includes one of a noise power level, a signal to noise ratio (SNR), and a bit error rate (BER), with regard to each of the plurality of channels.

As described above, according to the equalization apparatus 100 and the equalization method of the present example embodiment, it is possible to equalize the difference in the transmitted signal quality among channels with a minimum penalty.

A Second Example Embodiment

Next, a second example embodiment of the present disclosure will be described.

Figure 3:
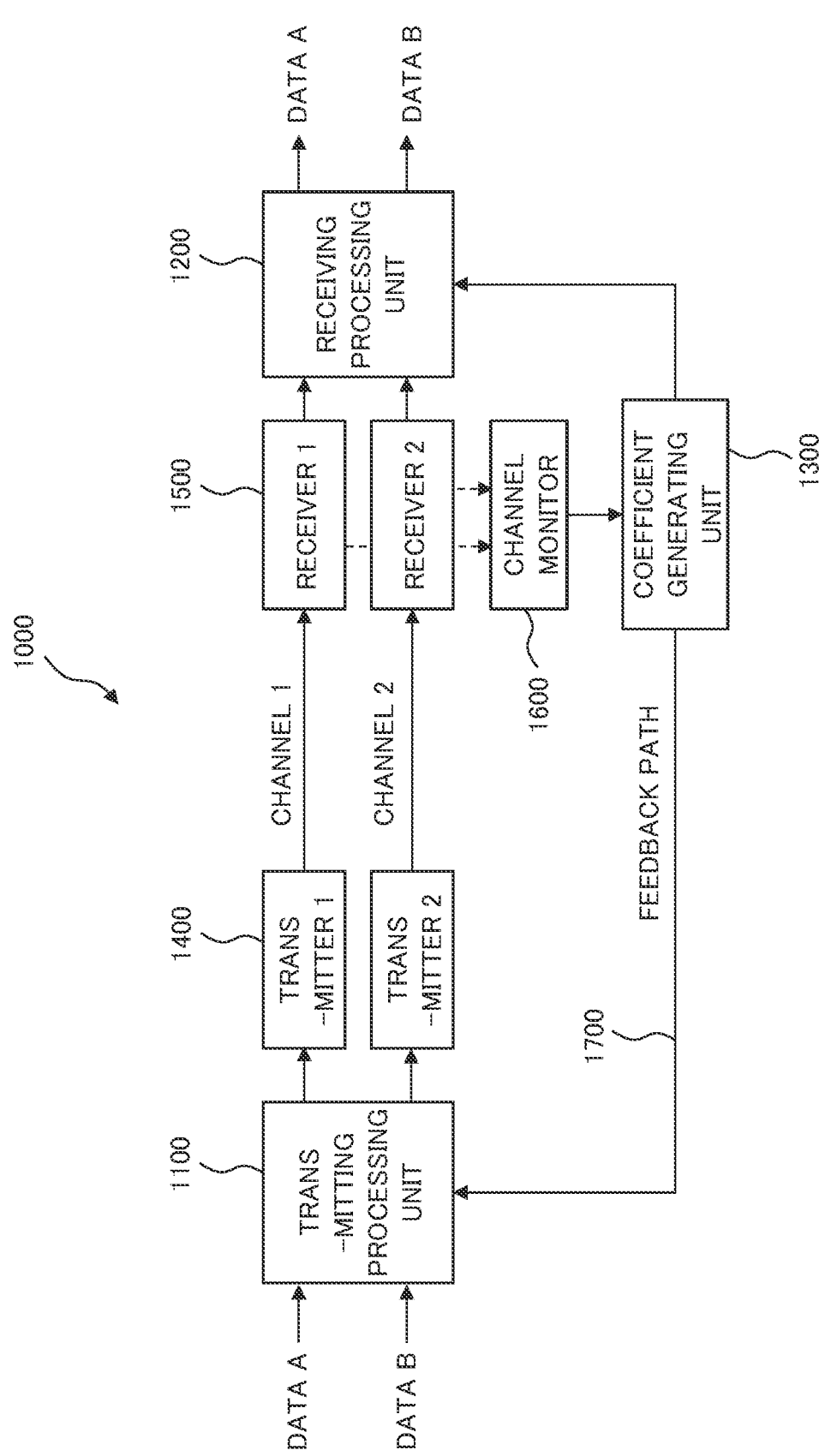
FIG. 3 is a block diagram illustrating the configuration of an optical transmission system in accordance with a second example embodiment of the present disclosure.

FIG. 3 is a block diagram illustrating an optical transmission system 1000 in accordance with the second example embodiment of the present disclosure. The optical transmission system 1000 includes a transmitting processing unit (a transmitting processing means) 1100, a receiving processing unit (a receiving processing means) 1200, and a coefficient generating unit (a coefficient generating means) 1300.

The transmitting processing unit 1100 is configured to receive input of data to be transmitted through a plurality of channels, and convert the data into a signal using a first transfer matrix with a coefficient in such a way as to give more signal power to a channel with lower channel quality. The receiving processing unit 1200 is configured to receive input of the signal after propagating through the plurality of channels, and restore the signal after the propagating to the data using a second transfer matrix that is an inverse matrix of the first transfer matrix. The coefficient generating unit 1300 is configured to generate the coefficient based on channel quality information on each of the plurality of channels.

The optical transmission system 1000 further includes a transmitter (a transmitting means) 1400, a receiver (a receiving means) 1500, and a channel monitor (a channel monitoring means) 1600.

The transmitter 1400 is configured to perform an electrical-optical modulation process on the signal. The receiver 1500 is configured to perform an optical-electrical demodulation process on the signal after the propagating. The channel monitor 1600 is configured to obtain the channel quality information from the receiver 1500. In this case, the coefficient generating unit 1300 obtains the channel quality information from the channel monitor 1600.

As illustrated in FIG. 3, the transmitting processing unit 1100 is placed at the transmitter side in a typical optical fiber transmission system. The receiving processing unit 1200 and the channel monitor 1600 are placed at the receiver side. The coefficient generating unit 1300 can be also placed at the receiver side, for example. The feedback path 1700 is configured to connect the coefficient generating unit 1300 to the transmitting processing unit 1100 and the receiving processing unit 1200.

Next, the operation of the optical transmission system 1000 will be described.

The transmitting processing unit 1100 is configured to process the input data A and input data B with predetermined operations. In the transmitting processing unit 1100, a transfer matrix (first transfer matrix) is used to process the input data A and input data B. Then the output processed data are signal C and signal D. The relationship between the input data and output data of the transmitting processing unit 1100 is expressed in Equation (1). It is noted that the data A and data B are modulated symbols with common modulation format such as QPSK (Quadrature Phase Shift Keying), 16QAM (Quadrature Amplitude Modulation), and 64QAM.

$$\begin{bmatrix} C \\ D \end{bmatrix} = H_{TX} \cdot \begin{bmatrix} A \\ B \end{bmatrix} \tag{1}$$

$H_{TX}$ represents the transfer matrix having coefficients expressed in Equation (2).

$$H_{TX} = \begin{bmatrix} \sqrt{\dfrac{\sigma_1}{\sigma_1+\sigma_2}} & i\sqrt{\dfrac{\sigma_1}{\sigma_1+\sigma_2}} \\ i\sqrt{\dfrac{\sigma_2}{\sigma_1+\sigma_2}} & -\sqrt{\dfrac{\sigma_2}{\sigma_1+\sigma_2}} \end{bmatrix} \tag{2}$$

It is noted that "i" represents the imaginary unit, and that $\sigma_1$ and $\sigma_2$ represent the coefficients decided by the coefficient generating unit 1300 according to the channel quality information obtained from the channel monitor 1600.

To give an intrinsic explanation of this transfer matrix, the transfer matrix is configured in such a format that it separates multiple input data A and input data B into two pieces with a specific ratio and mixes together to form the output processed data C and D. The specific ratio is decided by the coefficient generating unit 1300 using the channel quality information from the channel monitor 1600.

It is noted that Equation (2) expresses an example of transfer matrix with coefficients. Another example transfer matrix is expressed in Equation (3).

$$H_{TX} = \begin{bmatrix} \sqrt{\dfrac{\sigma_1}{\sigma_1+\sigma_2}} & -i\sqrt{\dfrac{\sigma_1}{\sigma_1+\sigma_2}} \\ -i\sqrt{\dfrac{\sigma_2}{\sigma_1+\sigma_2}} & \sqrt{\dfrac{\sigma_2}{\sigma_1+\sigma_2}} \end{bmatrix} \tag{3}$$

Any other matrix configured as an element-wise product of a coefficient matrix and an orthogonal matrix can be used as the transfer matrix. The general form is expressed in Equation (4).

$$H_{TX} = C \circ Q = \begin{bmatrix} \sqrt{\dfrac{\sigma_1}{\sigma_1+\sigma_2}} & \sqrt{\dfrac{\sigma_1}{\sigma_1+\sigma_2}} \\ \sqrt{\dfrac{\sigma_2}{\sigma_1+\sigma_2}} & \sqrt{\dfrac{\sigma_2}{\sigma_1+\sigma_2}} \end{bmatrix} \circ Q \tag{4}$$

C represents the coefficient matrix. Q represents an orthogonal matrix. And the dot "o" represents an element-wise product.

That is to say, the first transfer matrix includes a square matrix having a same number of columns as a number of the plurality of channels. The square matrix is expressed as an element-wise product of a coefficient matrix and an orthogonal matrix. In this case, the coefficient generating unit 1300 is configured to determine matrix elements of the coefficient matrix.

The output of the transmitting processing unit 1100 is connected to the transmitters 1 and 2. The transmitters 1 and 2 are configured to execute necessary operations to the input signals such as electrical-optical modulation and amplification to make them suitable for being transmitted through the channels 1 and 2. The signals output from the transmitters 1 and 2 are transmitted through channels 1 and 2.

The receivers 1 and 2 are configured to receive the signals and transform optical signals into electrical signals. The receiving processing unit 1200 receives the output of receivers 1 and 2. In the receiving processing unit 1200, an inverse matrix of the transfer matrix in the transmitting processing unit 1100 is used to restore the mixed data C and D to original data A and B. The detail of this operation inside the receiving processing unit 1200 is expressed in Equation (5).

$$\begin{bmatrix} A \\ B \end{bmatrix} = H_{TX}^{-1} \cdot \begin{bmatrix} C \\ D \end{bmatrix} \tag{5}$$

$H_{TX}^{-1}$ represents the inverse matrix of the transfer matrix expressed in Equation (2), (3), or (4).

The channel monitor 1600 is configured to obtain the channel quality information from the receivers 1 and 2. In the present example embodiment, the channel quality information is indicated by the noise power, which can be measured by receivers 1 and 2. The noise power measured in channel 1 is represented by N1. The noise power measured in channel 2 is represented by N2. The coefficient generating unit 1300 generates the coefficients for the transfer matrix and the inverse transfer matrix using the following Equations (6) and (7).

$$\sigma_1 = \sqrt{N1} \tag{6}$$

$$\sigma_2 = \sqrt{N2} \tag{7}$$

In the present example embodiment, the channel quality information can also be indicated by a signal to noise ratio (SNR) at the receiver side. The SNR measured in channel 1 is represented by SNR1. The SNR measured in channel 2 is represented by SNR2. Then the coefficient generating unit 1300 generates the coefficients for the transfer matrix and the inverse transfer matrix using the following Equations (8) and (9).

$$\sigma_1 = \frac{1}{\sqrt{SNR1}} \tag{8}$$

$$\sigma_2 = \frac{1}{\sqrt{SNR2}} \tag{9}$$

It is noted that the abovementioned configurations of the channel monitor 1600 and the coefficient generating unit 1300 are examples of the present example embodiment. The channel quality information is not restricted to the noise power level and the SNR. The channel quality information includes a bit error rate (BER) or Q-factor. Q-factor is defined as a minimum SNR required to obtain a specific BER for a given signal. Any other information to indicate the channel quality difference among the channels can be included in the channel quality information of the present example embodiment. In addition, any other methods for obtaining the channel quality information and any other indicators for indicating the channel quality information can be included in the present example embodiment.

By using the equalization apparatus including the transmitting processing unit 1100, the receiving processing unit 1200, and the coefficient generating unit 1300, more signal power is allocated to the channel having higher noise power. As a result, the SNR of the transmitted signal can be equalized in both channels.

At the receiver side, the transmitted mixed signal is restored to the original data A and B. Since the channel noise power information is obtained by the channel monitor 1600, it can be proved that the transfer matrix expressed in Equation (4) with coefficients determined by the coefficient generating unit 1300 minimizes the added noise. As a result, according to the abovementioned equalization apparatus of the present example embodiment, it is able to reduce the signal quality difference among different channels with minimized penalty.

Figure 4:
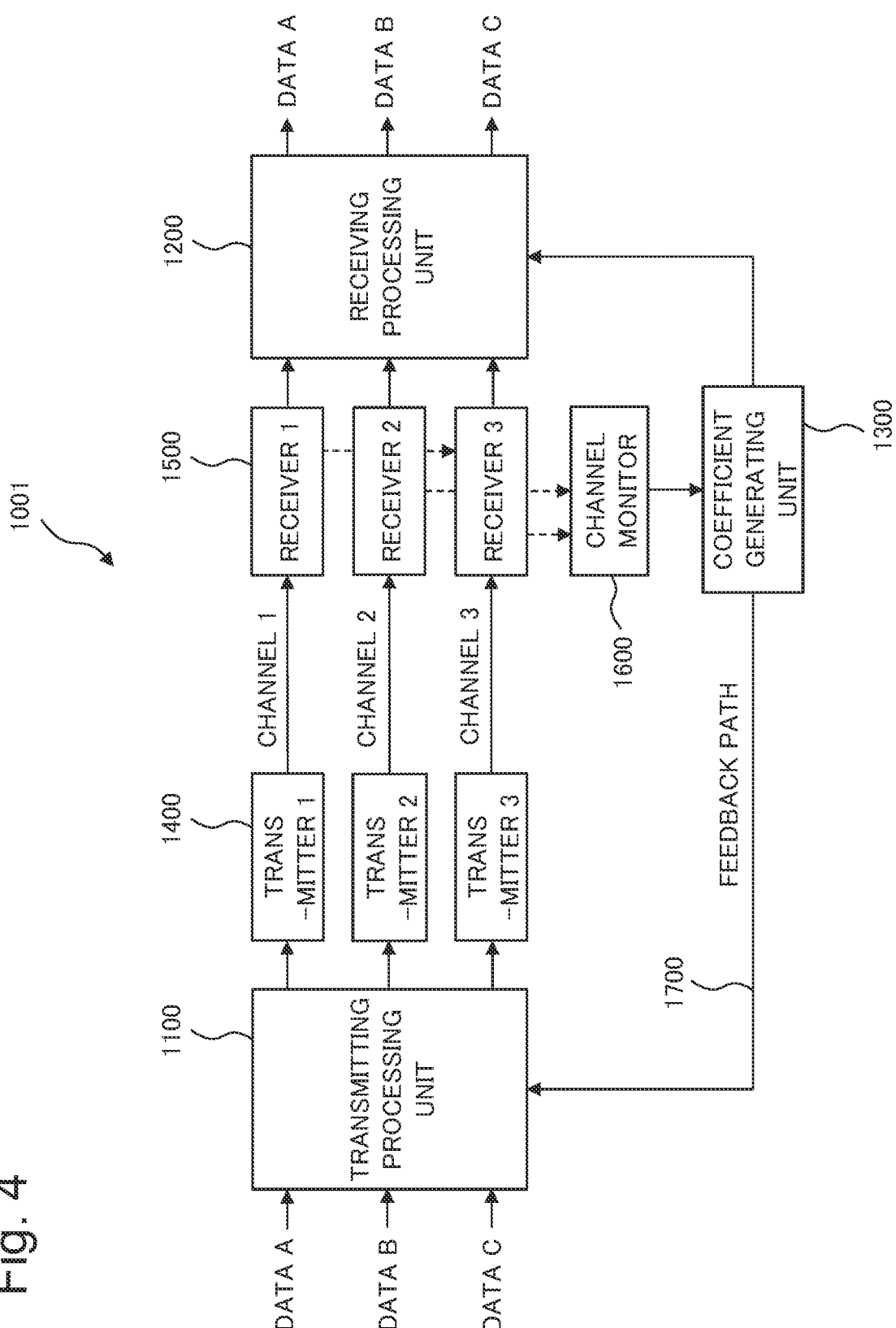
FIG. 4 is a block diagram illustrating another configuration of an optical transmission system in accordance with a second example embodiment of the present disclosure.

It is also noted that the configuration of the optical transmission system of the present example embodiment can be scaled to a multiplexed transmission system with channels more than two. FIG. 4 illustrates the configuration of an optical transmission system 1001 as an example of three-channel configuration. The most different point in this configuration is the transfer matrix with coefficients inside the transmitting processing unit 1100 and the receiving processing unit 1200. The transfer matrix configured to process the three channels of data is expressed in Equation (10).

$$H_{TX} = \tag{10}$$

$$\left[ \begin{array}{ccc} \sqrt{\dfrac{\sigma_1}{\sigma_1 + \sigma_2 + \sigma_3}} & \sqrt{\dfrac{\sigma_1}{\sigma_1 + \sigma_2 + \sigma_3}} & \sqrt{\dfrac{\sigma_1}{\sigma_1 + \sigma_2 + \sigma_3}} \\ \sqrt{\dfrac{\sigma_2}{\sigma_1 + \sigma_2 + \sigma_3}} & \sqrt{\dfrac{\sigma_2}{\sigma_1 + \sigma_2 + \sigma_3}} \cdot e^{\frac{2}{3}\pi i} & \sqrt{\dfrac{\sigma_2}{\sigma_1 + \sigma_2 + \sigma_3}} \cdot e^{\frac{4}{3}\pi i} \\ \sqrt{\dfrac{\sigma_3}{\sigma_1 + \sigma_2 + \sigma_3}} & \sqrt{\dfrac{\sigma_3}{\sigma_1 + \sigma_2 + \sigma_3}} \cdot e^{\frac{4}{3}\pi i} & \sqrt{\dfrac{\sigma_3}{\sigma_1 + \sigma_2 + \sigma_3}} \cdot e^{\frac{2}{3}\pi i} \end{array} \right]$$

It is noted that "i" represents the imaginary unit, "e" represents the Euler's number, and that $\sigma_1$, $\sigma_2$, and $\sigma_3$ represent the coefficients decided by the coefficient generating unit 1300 according to the channel quality information obtained from the channel monitor 1600.

In general case, for an N channel transmission system, where N is any natural number, the transfer matrix configured to process the N channels of data is expressed in Equation (11).

$$H_{TX} = C_N \circ Q_N = \left[ \begin{array}{ccc} \sqrt{\dfrac{\sigma_1}{\sigma_1 + \dots + \sigma_N}} & \cdots & \sqrt{\dfrac{\sigma_1}{\sigma_1 + \dots + \sigma_N}} \\ \vdots & \ddots & \vdots \\ \sqrt{\dfrac{\sigma_N}{\sigma_1 + \dots + \sigma_N}} & \cdots & \sqrt{\dfrac{\sigma_N}{\sigma_1 + \dots + \sigma_N}} \end{array} \right] \circ Q_N \tag{11}$$

$C_N$ represents an N×N coefficient matrix. $Q_N$ represents an N×N orthogonal matrix. It is noted that the orthogonal matrix can be configured with any formats for a given size N×N.

As an example, when complex Hadamard matrix is used as the orthogonal matrix in Equation. 11, the transfer matrix is expressed in Equation (12). EN represents an example of the complex Hadamard matrix in the format of Fourier matrix.

$$H_{TX} = C_N \circ Q_N = \left[ \begin{array}{ccc} \sqrt{\dfrac{\sigma_1}{\sigma_1 + \dots + \sigma_N}} & \cdots & \sqrt{\dfrac{\sigma_1}{\sigma_1 + \dots + \sigma_N}} \\ \vdots & \ddots & \vdots \\ \sqrt{\dfrac{\sigma_N}{\sigma_1 + \dots + \sigma_N}} & \cdots & \sqrt{\dfrac{\sigma_N}{\sigma_1 + \dots + \sigma_N}} \end{array} \right] \circ F_N, \tag{12}$$

$$\text{where } [F_N]_{jk} = \exp\left[ \frac{(2\pi i (j-1)(k-1))}{N} \right] \text{ for } j, k = 1, 2, \dots, N$$

It is noted that the orthogonal matrix used for the transfer matrix of the present example embodiment is not limited to the aforementioned examples. Any other orthogonal matrix such as a discrete Fourier transform (DFT) matrix can be used to form the transfer matrix that is composed of an element-wise product of the coefficient matrix and the orthogonal matrix.

Figure 5:
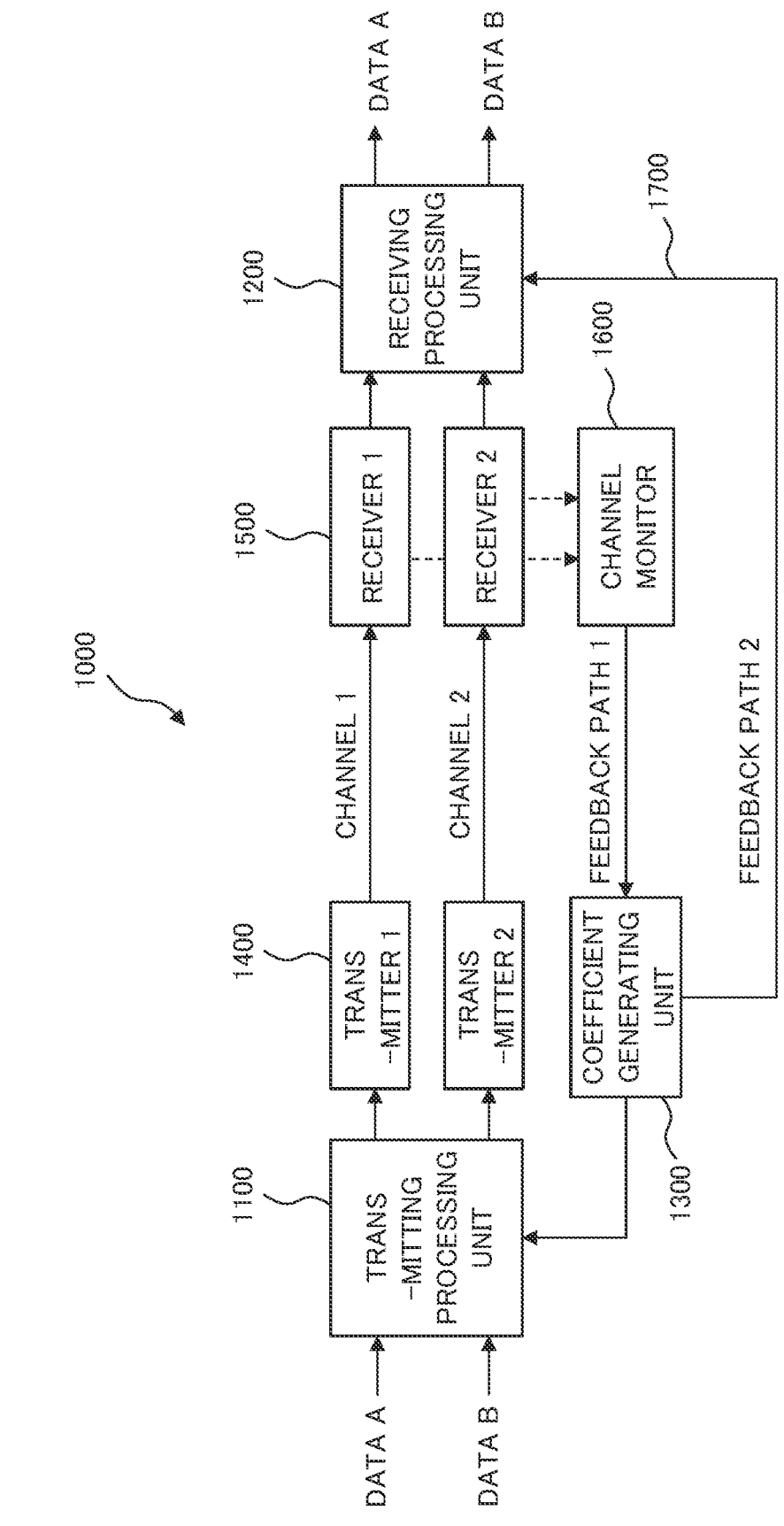
FIG. 5 is a block diagram illustrating yet another configuration of an optical transmission system in accordance with a second example embodiment of the present disclosure.

It is noted that the coefficient generating unit 1300 is not limited to being placed at the receiver side. According to practical deployment, the coefficient generating unit 1300 can be placed at the transmitter side, as illustrated in FIG. 5. The channel monitor 1600 obtains the channel information at the receiver side. Then the channel information is given to the coefficient generating unit 1300 through feedback path 1. The coefficient generating unit 1300 generates optimized coefficients for the transfer matrix and the inverse transfer matrix. The coefficients for the inverse transfer matrix at the receiver side is given through feedback path 2.

Figure 6:
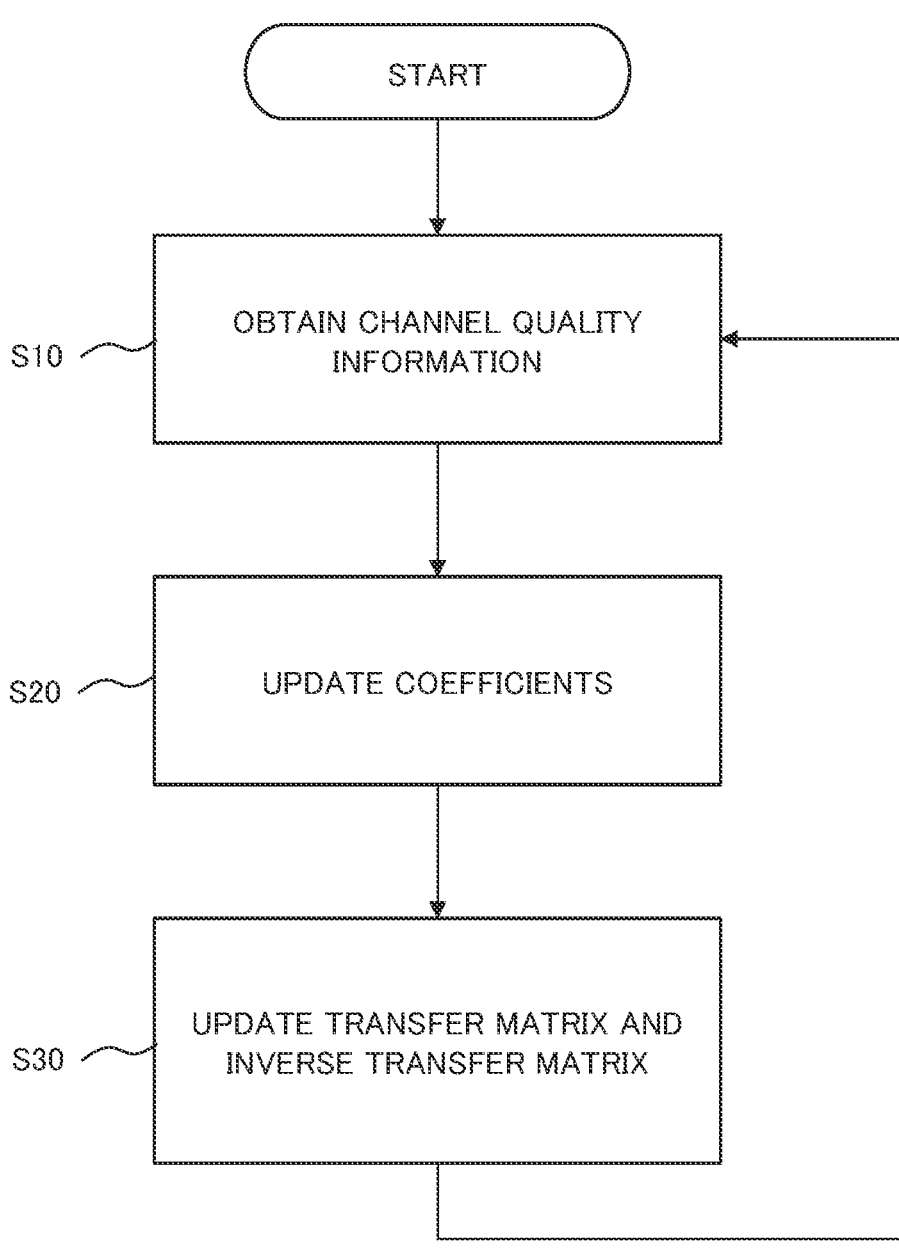
FIG. 6 is a flowchart to explain an operation method of an optical transmission system in accordance with a second example embodiment of the present disclosure.

Next, the operation method of the optical transmission system 1000 according to the present example embodiment will be described. FIG. 6 illustrates a flow chart to explain the operation method of the optical transmission system 1000 according to the present example embodiment.

In the operation method of the optical transmission system 1000, first, the channel quality information is obtained (Step S10). The channel quality information is the aforementioned SNR, the noise power, or any other information that indicates the channel quality information. The channel quality information is obtained by the channel monitor 1600.

Next, the coefficients are updated (Step S20). It is noted that all the default coefficients are set at 1, which means that the equalization is disabled at the beginning. This process is performed in order to monitor the channel quality information correctly. Once the channel quality information is obtained, the coefficient generating unit 1300 generates optimized coefficients for the transfer matrix and the inverse transfer matrix.

The transfer matrix in the transmitting processing unit 1100 and the inverse transfer matrix in the receiving processing unit 1200 are updated using the updated coefficients obtained from the coefficient generating unit 1300 through the feedback path (Step S30). After the transfer matrix and the inverse transfer matrix are updated, the step goes to S10, so that the optical transmission system 1000 is being equalized iteratively. Even if the characteristic of the channel quality changes due to other factors such as physical shape distortion or temperature variation, the operation method is able to maintain a stable advantageous effect.

As an example, the plurality of channels, which are illustrated in FIG. 3, 4, 5 and are described in the aforementioned example embodiment, are different cores of a multi-core fiber (MCF) through which the signal propagates. According to the geometry of the fiber, the crosstalk and therefore the noise of each channel is different. So the equalization apparatus is defined as described in the aforementioned example embodiment in order to eliminate the channel performance differences with a minimized penalty.

As an alternative example, the plurality of channels, which are illustrated in FIG. 3, 4, 5 and are described in the aforementioned example embodiment, are different wavelengths in a wavelength division multiplexing (WDM) on which the signal propagates. Because the noise is dependent on the wavelength characteristic that varies for different wavelengths, the noise of each channel is different. So the equalization apparatus is defined as described in the aforementioned example embodiment in order to eliminate the channel performance differences with a minimized penalty.

As described above, according to the optical transmission system 1000 and the operation method of the optical transmission system 1000 of the present example embodiment, it is possible to equalize the difference in the transmitted signal quality among channels with a minimum penalty.

A Third Example Embodiment

Next, a third example embodiment of the present invention will be described.

Figure 7:
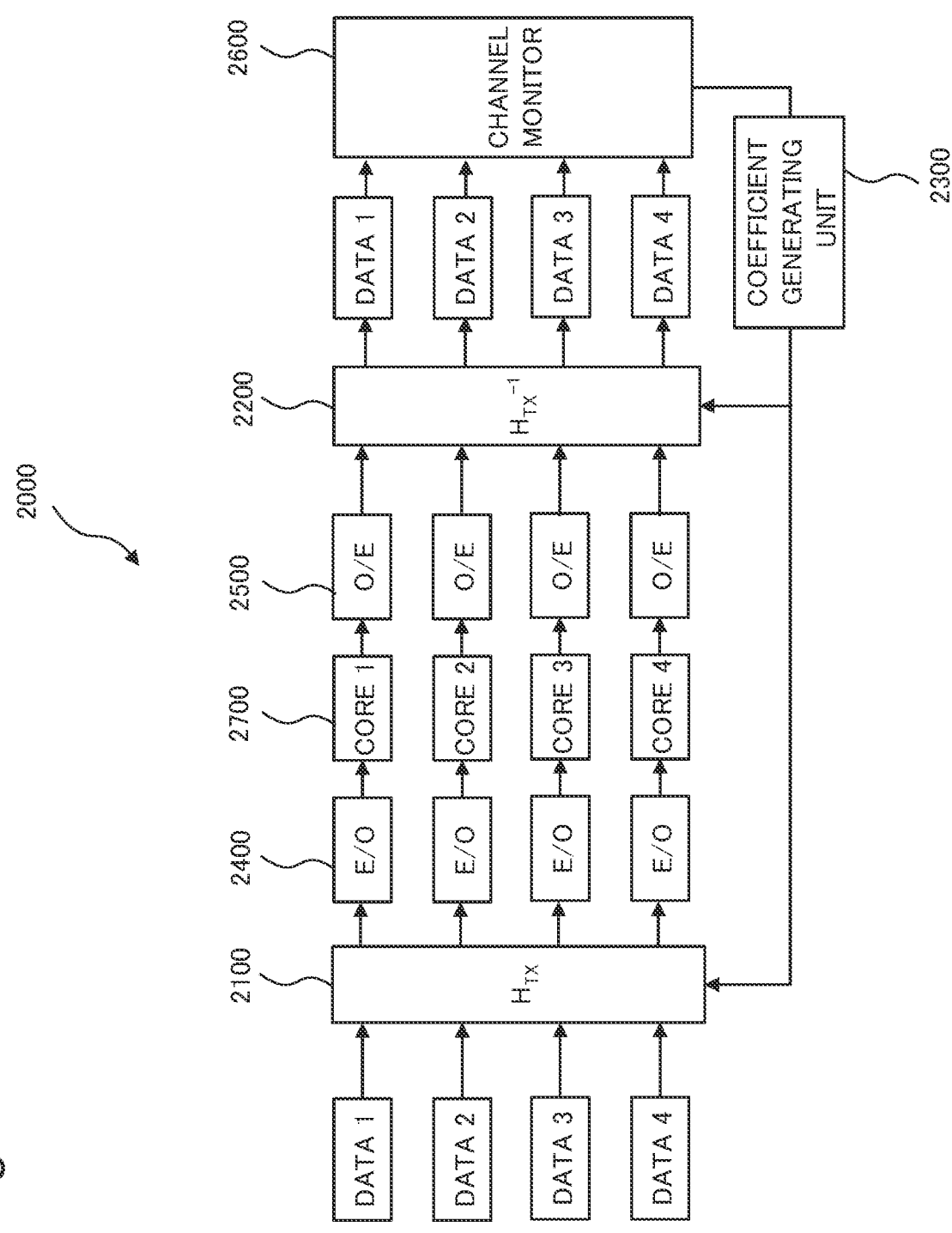
FIG. 7 is a block diagram illustrating the configuration of an optical transmission system in accordance with a third example embodiment of the present disclosure.

FIG. 7 is a block diagram illustrating an optical transmission system 2000 in accordance with the third example embodiment of the present invention. The optical transmission system 2000 includes a transmitting processing unit (a transmitting processing means) 2100, a receiving processing unit (a receiving processing means) 2200, and a coefficient generating unit (a coefficient generating means) 2300. The transmitting processing unit 2100, the receiving processing unit 2200, and the coefficient generating unit 2300 constitute an equalization apparatus. The optical transmission system 2000 further includes a transmitter (a transmitting means) 2400, a receiver (a receiving means) 2500, a channel monitor (a channel monitoring means) 2600, and a channel 2700.

The transmitting processing unit 2100 is configured to process first data and second data into a first processed signal and a second processed signal using a third transfer matrix ($H_{TX}$) as the transfer function in such a way as to give more signal power to a channel with lower channel quality. The first processed signal is to be transmitted through a first channel of the plurality of channels. The second processed signal is to be transmitted through a second channel of the plurality of channels. The first channel and the second channel have largest difference in channel quality.

The receiving processing unit 2200 is configured to restore the first processed signal after propagating through the first channel and the second processed signal after propagating through the second channel to the first data and the second data, using a fourth transfer matrix as the transfer function. The fourth transfer matrix is an inverse matrix of the third transfer matrix ($H_{TX}^{-1}$).

The coefficient generating unit 2300 is configured to generate the coefficient of the transfer matrix based on channel quality information on each of the plurality of channels. The channel monitoring unit 2600 is configured to obtain the channel quality information.

As mentioned above, in the optical transmission system 2000 in accordance with the present example embodiment, the transmitting processing unit 2100 equalizes the difference in the channel quality only between the best quality channel and the worst quality channel. Therefore, the calculation requirement becomes lower.

The transmitter 2400 is configured to perform an electrical-optical (E/O) modulation process on the signal. The receiver 2500 is configured to perform an optical-electrical (O/E) demodulation process on the signal after the propagating. As illustrated in FIG. 7, the channel 2700 is a different core of a multi-core fiber (MCF) through which the signal propagates, for example.

Next, the operation of the optical transmission system 2000 will be described.

The optical transmission system 2000 starts the equalization process before normal transmission. The transfer matrix $H_{TX}$ and the inverse matrix $H_{TX}^{-1}$ are set to an identity matrix as shown below, in order to bypass all data.

$$H_{TX} = H_{TX}^{-1} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The channel monitor 2600 measures the noise power as the channel quality in each core. In this example, the order of the magnitude of the measured noise power in each core is expressed as core 2<core 1<core 4<core 3. Because the signal through core 2 and the signal through core 3 have largest difference in the channel quality such as Q-factor, the data for core 2 and the data for core 3 will be processed by the transfer matrix $H_{TX}$ and the inverse matrix $H_{TX}^{-1}$. However, the data for core 1 and the data for core 4 will not be processed, that is, bypassed.

According to the information from the channel monitor 2600, the transfer matrix $H_{TX}$ is configured to equalize the data for core 2 and the data for core 3, as follows.

$$H_{TX} = \begin{bmatrix} 1 & 0 & 0 & 0 \\ 0 & \sqrt{\dfrac{\sigma_2}{\sigma_2 + \sigma_3}} & -i\sqrt{\dfrac{\sigma_2}{\sigma_2 + \sigma_3}} & 0 \\ 0 & -i\sqrt{\dfrac{\sigma_3}{\sigma_2 + \sigma_3}} & \sqrt{\dfrac{\sigma_3}{\sigma_2 + \sigma_3}} & 0 \\ 0 & 0 & 0 & 1 \end{bmatrix}$$

It is noted that "i" represents the imaginary unit, and that 62 and 63 represent the coefficients decided by the coefficient generating unit 2300 according to the noise power in core 2 and core 3 measured by the channel monitor 2600.

The inverse matrix $H_{TX}^{-1}$ is configured to restore the signal through core 2 and the signal through core 3. And then, normal transmission of the optical transmission system 2000 starts.

Figure 8:
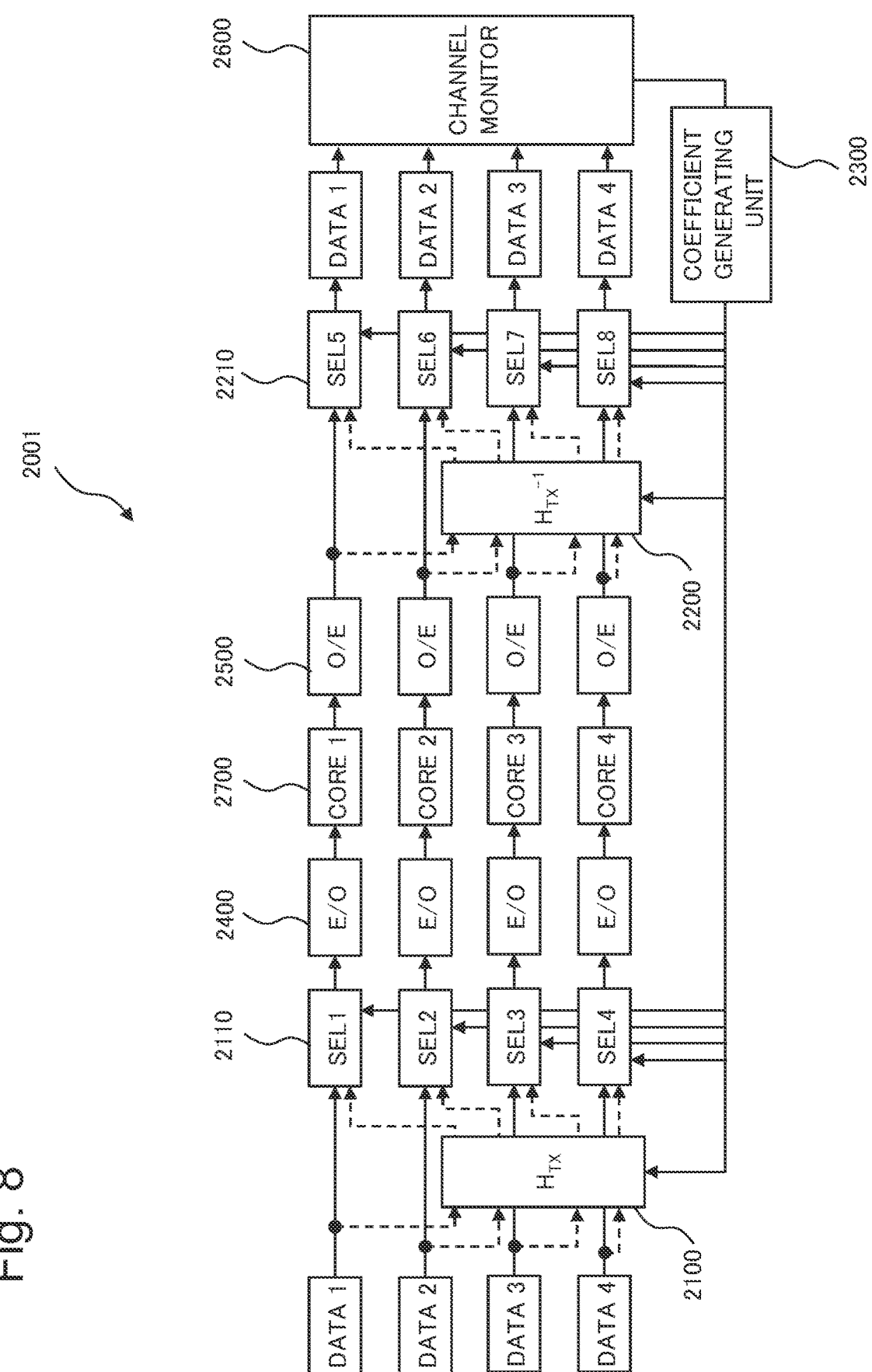
FIG. 8 is a block diagram illustrating another configuration of an optical transmission system in accordance with a third example embodiment of the present disclosure.

As an optical transmission system 2001 illustrated in FIG. 8, a first selector (a first selecting means) 2110 and a second selector (a second selecting means) 2210 can be further included. The first selector 2110 and the second selector 2210 are included in the equalization apparatus.

The first selector 2110 is configured to select the first processed signal for the first channel, select the second processed signal for the second channel, and select other data for other channel of the plurality of channels. The second selector 2210 is configured to select the first data and the second data obtained by restoring the first processed signal and the second processed signal, and select the other data propagating through the other channel.

Next, the operation of the optical transmission system 2001 will be described.

The optical transmission system 2001 starts the equalization process before normal transmission. All selectors are set to let all data directly go, that is, dashed line off, solid line on in FIG. 8.

According to the information from the channel monitor 2600, the transfer matrix $H_{TX}$ is configured to equalize the data for core 2 and the data for core 3, as follows.

$$H_{TX} = \begin{bmatrix} \text{any number} & \text{any number} & \text{any number} & \text{any number} \\ \text{any number} & \sqrt{\dfrac{\sigma_2}{\sigma_2 + \sigma_3}} & -i\sqrt{\dfrac{\sigma_2}{\sigma_2 + \sigma_3}} & \text{any number} \\ \text{any number} & -i\sqrt{\dfrac{\sigma_3}{\sigma_2 + \sigma_2}} & \sqrt{\dfrac{\sigma_3}{\sigma_2 + \sigma_3}} & \text{any number} \\ \text{any number} & \text{any number} & \text{any number} & \text{any number} \end{bmatrix}$$

The selectors are also configured to equalize the data for core 2 and the data for core 3, and let the data for core 1 and the data for core 4 bypass. That is to say, SEL2, SEL3, SEL6, and SEL7 illustrated in FIG. 8 are switched, and the other selectors remains.

Figure 9:
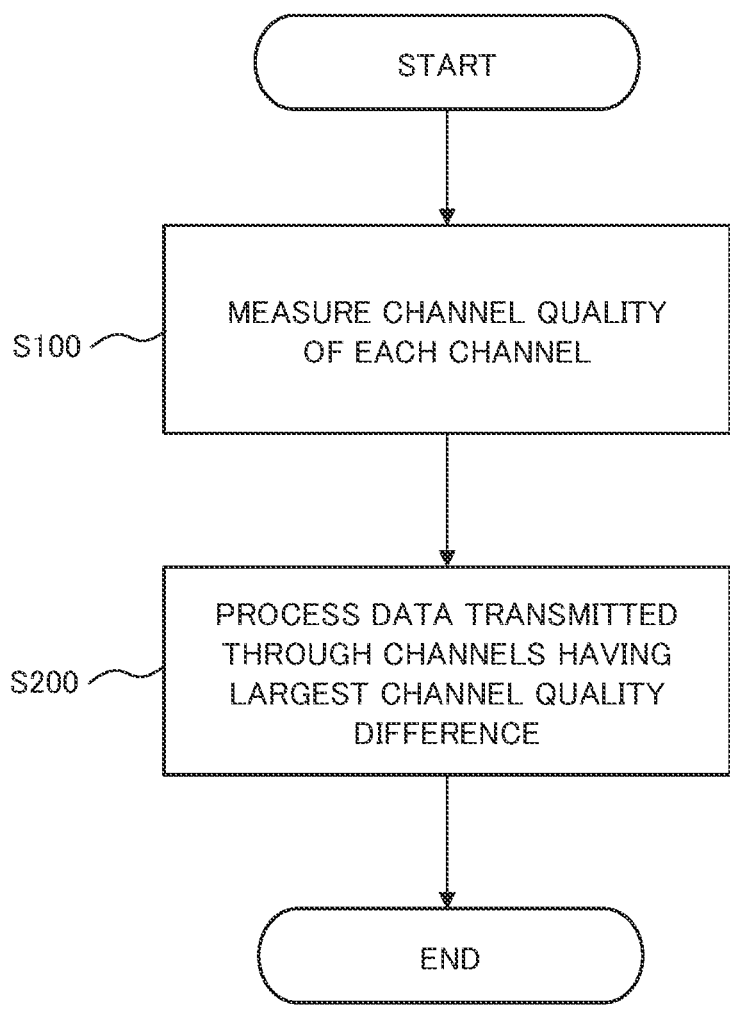
FIG. 9 is a flowchart to explain an equalization method of an optical transmission system in accordance with a third example embodiment of the present disclosure.

Next, an equalization method in accordance with the present example embodiment will be described. FIG. 9 illustrates a flow chart to explain the equalization method according to the present example embodiment.

In the equalization method, first, a process associated with a signal using a transfer function with a coefficient is performed. The signal is to propagate through each of a plurality of channels. And, the coefficient is generated based on channel quality information on each of the plurality of channels.

The generating of the coefficient includes measuring channel quality of each of the plurality of channels (Step S100). The performing of the process associated with the signal includes processing data to be transmitted through channels having largest difference in the channel quality in such a way as to give more signal power to a channel with lower channel quality (Step S200).

As described above, according to the optical transmission system 2000, 2001 and the equalization method of the present example embodiment, it is possible to equalize the difference in the transmitted signal quality among channels with a minimum penalty. In addition, it is also possible to decrease the calculation requirement for the equalization process.

A Fourth Example Embodiment

Next, a fourth example embodiment of the present invention will be described.

Figure 10:
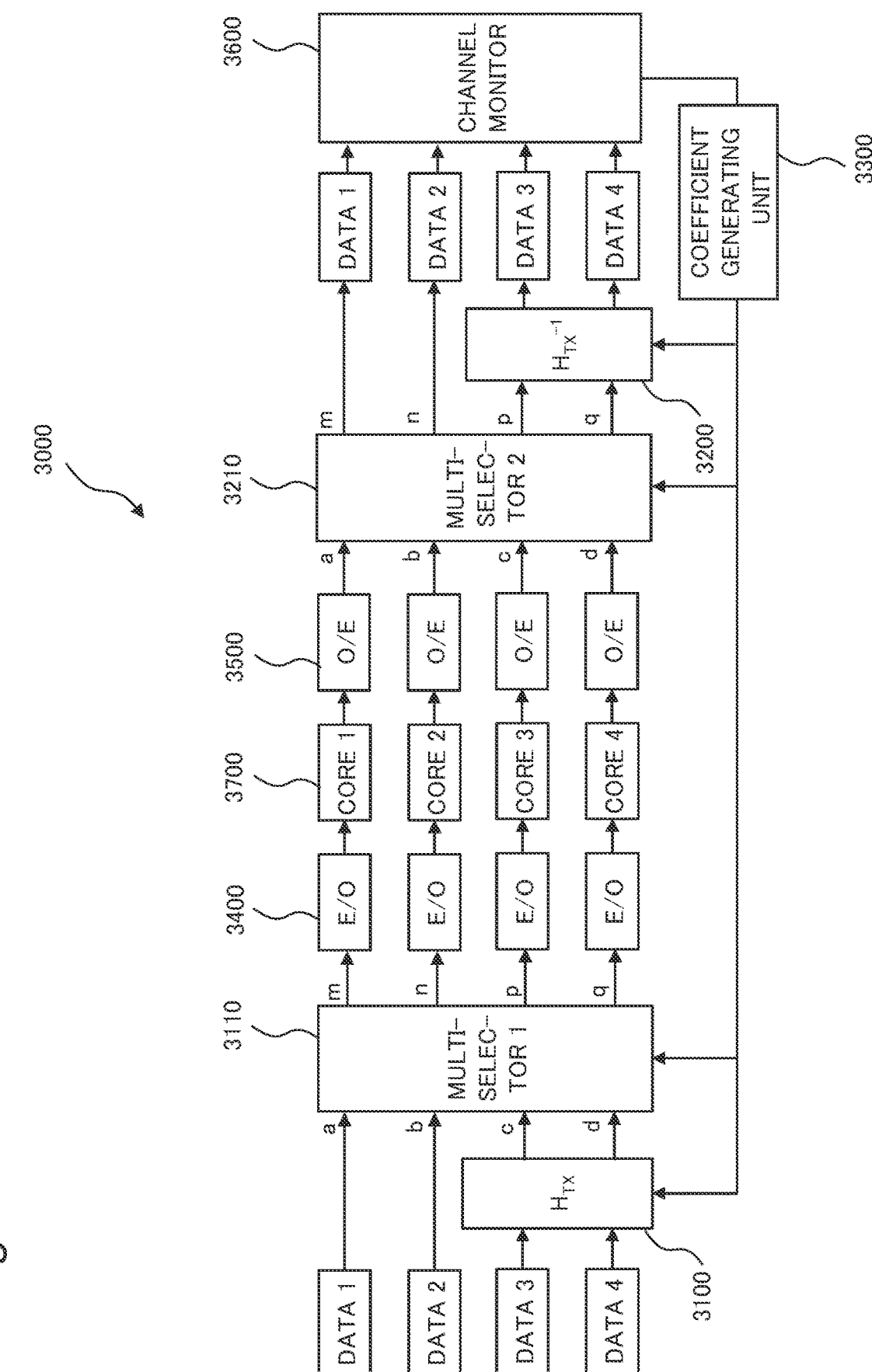
FIG. 10 is a block diagram illustrating the configuration of an optical transmission system in accordance with a fourth example embodiment of the present disclosure.

FIG. 10 is a block diagram illustrating an optical transmission system 3000 in accordance with the fourth example embodiment of the present invention. The optical transmission system 3000 includes a transmitting processing unit (a transmitting processing means) 3100, a receiving processing unit (a receiving processing means) 3200, and a coefficient generating unit (a coefficient generating means) 3300. The transmitting processing unit 3100, the receiving processing unit 3200, and the coefficient generating unit 3300 constitute an equalization apparatus. The optical transmission system 3000 further includes a transmitter (a transmitting means) 3400, a receiver (a receiving means) 3500, a channel monitor (a channel monitoring means) 3600, and a channel 3700.

The optical transmission system 3000 further includes a first multi-selector (a first multi-selecting means) 3110 and a second multi-selector (a second multi-selecting means) 3210. The first multi-selector 3110 and the second multi-selector 3210 are able to connect any one of input ports (a, b, c, d) to any one of output ports (m, n, p, q). The first multi-selector 3110 and the second multi-selector 3210 are included in the equalization apparatus.

The transmitting processing unit 3100 is configured to process first data and second data into a first processed signal and a second processed signal using a third transfer matrix ($H_{TX}$) as the transfer function in such a way as to give more signal power to a channel with lower channel quality. The first multi-selector 3110 is configured to select the first processed signal for a first channel of the plurality of channels, and select the second processed signal for a second channel of the plurality of channels. The first channel and the second channel have largest difference in channel quality.

The second multi-selector 3210 is configured to select, for the receiving processing unit 3200, the first processed signal after propagating through the first channel and the second processed signal after propagating through the second channel. The receiving processing unit 3200 is configured to restore the first processed signal and the second processed signal selected by the second multi-selector 3210 to the first data and the second data, using a fourth transfer matrix as the transfer function. The fourth transfer matrix is an inverse matrix of the third transfer matrix ($H_{TX}^{-1}$).

The coefficient generating unit 3300 is configured to generate the coefficient of the transfer matrix based on channel quality information on each of the plurality of channels. The channel monitoring unit 3600 is configured to obtain the channel quality information.

The transmitter 3400 is configured to perform an electrical-optical (E/O) modulation process on the signal. The receiver 3500 is configured to perform an optical-electrical (O/E) demodulation process on the signal after the propagating. As illustrated in FIG. 10, the channel 3700 is a different core of a multi-core fiber (MCF) through which the signal propagates, for example.

According to the optical transmission system 3000, it is possible to equalize the difference in the transmitted signal quality among channels with a minimum penalty, even though the transmitting processing unit 3100 is fixed in place. That is to say, even though the transmitting processing unit 3100 is located between data lane 3 and data lane 4 as an example illustrated in FIG. 10, it is possible to equalize the difference in quality between the signals propagating through core 2 and core 3, using the first multi-selector 3110 and the second multi-selector 3210.

Next, the operation of the optical transmission system 3000 will be described.

The optical transmission system 3000 starts the equalization process before normal transmission. The transfer matrix $H_{TX}$ and the inverse matrix $H_{TX}^{-1}$ are set to an identity matrix as shown below, in order to bypass all data.

$$H_{TX} = H_{TX}^{-1} = \begin{bmatrix} 1 & 0 \\ 0 & 1 \end{bmatrix}$$

The first multi-selector 3110 and the second multi-selector 3210 are set to connect input ports to output ports as follows: a-m, b-n, c-p, d-q.

The channel monitor 3600 measures the noise power as the channel quality in each core. In this example, the order of the magnitude of the measured noise power in each core is expressed as core 2<core 1<core 4<core 3. Because the signal through core 2 and the signal through core 3 have largest difference in the channel quality such as Q-factor, the data for core 2 and the data for core 3 will be processed by the transfer matrix $H_{TX}$ and the inverse matrix $H_{TX}^{-1}$. However, the data for core 1 and the data for core 4 will not be processed, that is, bypassed.

According to the information from the channel monitor 3600, the transfer matrix $H_{TX}$ is configured to equalize the data for core 2 and the data for core 3, as follows.

$$H_{TX} = \begin{bmatrix} \sqrt{\dfrac{\sigma_2}{\sigma_2 + \sigma_3}} & -i\sqrt{\dfrac{\sigma_2}{\sigma_2 + \sigma_3}} \\ -i\sqrt{\dfrac{\sigma_3}{\sigma_2 + \sigma_3}} & \sqrt{\dfrac{\sigma_3}{\sigma_2 + \sigma_3}} \end{bmatrix}$$

It is noted that "i" represents the imaginary unit, and that $\sigma_2$ and $\sigma_3$ represent the coefficients decided by the coefficient generating unit 3300 according to the noise power in core 2 and core 3 measured by the channel monitor 3600.

The first multi-selector 3110 and the second multi-selector 3210 are also configured to equalize the data for core 2 and the data for core 3, which means letting data 4 go to core 2. That is to say, the first multi-selector 3110 and the second multi-selector 3210 are set to connect input ports to output ports as follows: a-m, b-q, c-p, d-n.

The inverse matrix $H_{TX}^{-1}$ is configured to restore the signal through core 2 and the signal through core 3.

As a result, data 3 and data 4 are equalized by the transfer matrix $H_{TX}$ with coefficients 62 and 63 according to the noise power in core 2 and core 3, then transmitted through core 2 and core 3. This means that the data transmitted through the worst quality core and the best quality core are equalized.

And then, normal transmission of the optical transmission system 3000 starts.

Figure 11:
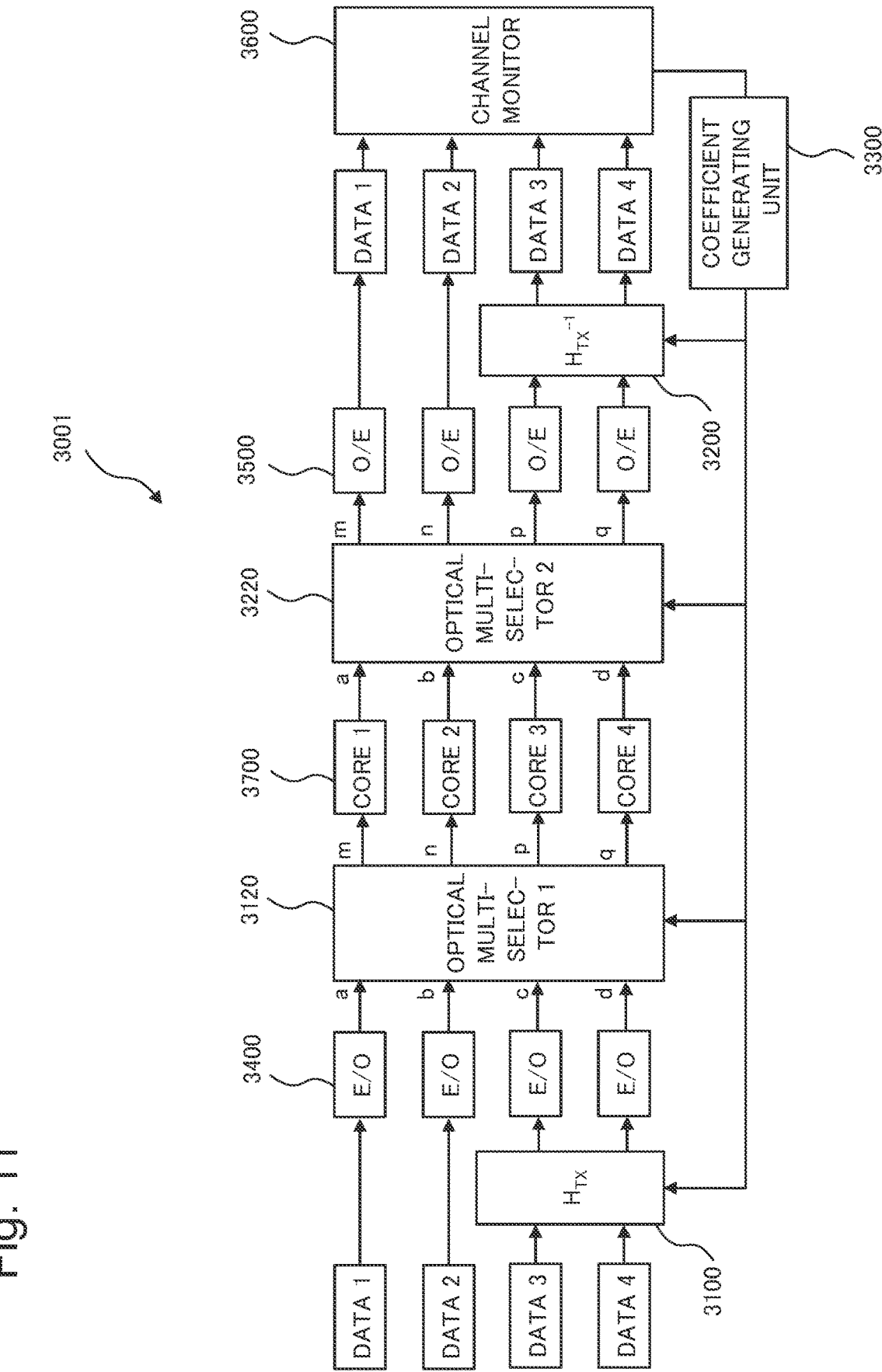
FIG. 11 is a block diagram illustrating another configuration of an optical transmission system in accordance with a fourth example embodiment of the present disclosure.

As an optical transmission system 3001 illustrated in FIG. 11, a first optical multi-selector 3120 and a second optical multi-selector 3220 can be used instead of the first multi-selector 3110 and the second multi-selector 3210. That is to say, the equalization of the data for core 2 and the data for core 3 can be performed in optical domain.

As described above, according to the optical transmission system 3000, 3001 of the present example embodiment, it is possible to equalize the difference in the transmitted signal quality among channels with a minimum penalty.

The whole or part of the example embodiments disclosed above can be described as, but not limited to, the following supplementary notes.

(Supplementary note 1) An equalization apparatus, comprising: a processing means for performing a process associated with a signal using a transfer function with a coefficient, the signal propagating through each of a plurality of channels; and a coefficient generating means for generating the coefficient based on channel quality information on each of the plurality of channels.

(Supplementary note 2) The equalization apparatus according to Supplementary note 1, wherein the processing means includes a transmitting processing means, and the transmitting processing means is configured to receive input of data to be transmitted through the plurality of channels, and convert the data into the signal using a first transfer matrix as the transfer function in such a way as to give more signal power to a channel with lower channel quality.

(Supplementary note 3) The equalization apparatus according to Supplementary note 2, wherein the processing means includes a receiving processing means, the receiving processing means is configured to receive input of the signal after propagating through the plurality of channels, and restore the signal after the propagating to the data using a second transfer matrix as the transfer function, and the second transfer matrix is an inverse matrix of the first transfer matrix.

(Supplementary note 4) The equalization apparatus according to any one of Supplementary notes 1, 2, and 3, wherein the transfer function includes a square matrix having a same number of columns as a number of the plurality of channels, and the square matrix is expressed as an element-wise product of a coefficient matrix and an orthogonal matrix.

(Supplementary note 5) The equalization apparatus according to Supplementary note 4, wherein the coefficient generating means is configured to determine matrix elements of the coefficient matrix.

(Supplementary note 6) The equalization apparatus according to any one of Supplementary notes 1, 2, 3, 4, and 5, wherein the channel quality information includes one of a noise power level, a signal to noise ratio, and a bit error rate, with regard to each of the plurality of channels.

(Supplementary note 7) The equalization apparatus according to any one of Supplementary notes 1, 2, 3, 4, 5, and 6, wherein the plurality of channels are different cores of a multi-core fiber through which the signal propagates.

(Supplementary note 8) The equalization apparatus according to any one of Supplementary notes 1, 2, 3, 4, 5, and 6, wherein the plurality of channels are different wavelengths in a wavelength division multiplexing on which the signal propagates.

(Supplementary note 9) An optical transmission system, comprising:

a transmitting processing means for receiving input of data to be transmitted through a plurality of channels, and converting the data into a signal using a first transfer matrix with a coefficient in such a way as to give more signal power to a channel with lower channel quality; a receiving processing means for receiving input of the signal after propagating through the plurality of channels, and restoring the signal after the propagating to the data using a second transfer matrix that is an inverse matrix of the first transfer matrix; and a coefficient generating means for generating the coefficient based on channel quality information on each of the plurality of channels.

(Supplementary note 10) The optical transmission system according to Supplementary note 9, further comprising a transmitting means for performing an electrical-optical modulation process on the signal, a receiving means for performing an optical-electrical demodulation process on the signal after the propagating, and a channel monitoring means for obtaining the channel quality information from the receiving means, wherein the coefficient generating means obtains the channel quality information from the channel monitoring means.

(Supplementary note 11) The optical transmission system according to Supplementary note 9 or 10, wherein the first transfer matrix includes a square matrix having a same number of columns as a number of the plurality of channels, and the square matrix is expressed as an element-wise product of a coefficient matrix and an orthogonal matrix.

(Supplementary note 12) The optical transmission system according to Supplementary note 11, wherein the coefficient generating means is configured to determine matrix elements of the coefficient matrix.

(Supplementary note 13) The optical transmission system according to any one of Supplementary notes 9, 10, 11, and 12, wherein the channel quality information includes one of a noise power level, a signal to noise ratio, and a bit error rate, with regard to each of the plurality of channels.

(Supplementary note 14) The optical transmission system according to any one of Supplementary notes 9, 10, 11, 12, and 13, wherein the plurality of channels are different cores of a multi-core fiber through which the signal propagates.

(Supplementary note 15) The optical transmission system according to any one of Supplementary notes 9, 10, 11, 12, and 13, wherein the plurality of channels are different wavelengths in a wavelength division multiplexing on which the signal propagates.

(Supplementary note 16) An equalization method, comprising: performing a process associated with a signal using a transfer function with a coefficient, the signal propagating through each of a plurality of channels; and generating the coefficient based on channel quality information on each of the plurality of channels.

(Supplementary note 17) The equalization method according to Supplementary note 16, wherein the performing of the process associated with the signal includes receiving input of data to be transmitted through the plurality of channels, and converting the data into the signal using a first transfer matrix as the transfer function in such a way as to give more signal power to a channel with lower channel quality.

(Supplementary note 18) The equalization method according to Supplementary note 17, wherein the performing of the process associated with the signal includes receiving input of the signal after propagating through the plurality of channels, and restoring the signal after the propagating to the data using a second transfer matrix as the transfer function, and the second transfer matrix is an inverse matrix of the first transfer matrix.

(Supplementary note 19) The equalization method according to any one of Supplementary notes 16, 17, and 18, wherein the transfer function includes a square matrix having a same number of columns as a number of the plurality of channels, and the square matrix is expressed as an element-wise product of a coefficient matrix and an orthogonal matrix.

(Supplementary note 20) The equalization method according to any one of Supplementary notes 16, 17, 18, and 19, wherein the channel quality information includes one of a noise power level, a signal to noise ratio, and a bit error rate, with regard to each of the plurality of channels.

(Supplementary note 21) The equalization apparatus according to Supplementary note 1, wherein the processing means includes a transmitting processing means, the transmitting processing means is configured to process first data and second data into a first processed signal and a second processed signal using a third transfer matrix as the transfer function in such a way as to give more signal power to a channel with lower channel quality, the first processed signal is to be transmitted through a first channel of the plurality of channels, the second processed signal is to be transmitted through a second channel of the plurality of channels, and the first channel and the second channel have largest difference in channel quality.

(Supplementary note 22) The equalization apparatus according to Supplementary note 21, wherein the processing means includes a receiving processing means, the receiving processing means is configured to restore the first processed signal after propagating through the first channel and the second processed signal after propagating through the second channel to the first data and the second data, using a fourth transfer matrix as the transfer function, and the fourth transfer matrix is an inverse matrix of the third transfer matrix.

(Supplementary note 23) The equalization apparatus according to Supplementary note 22, further comprising, a first selecting means for selecting the first processed signal for the first channel, selecting the second processed signal for the second channel, and selecting other data for other channel of the plurality of channels, and a second selecting means for selecting the first data and the second data obtained by restoring the first processed signal and the second processed signal, and selecting the other data propagating through the other channel.

(Supplementary note 24) The equalization apparatus according to Supplementary note 1, further comprising a first multi-selecting means, wherein the processing means includes a transmitting processing means, the transmitting processing means is configured to process first data and second data into a first processed signal and a second processed signal using a third transfer matrix as the transfer function in such a way as to give more signal power to a channel with lower channel quality, the first multi-selecting means is configured to select the first processed signal for a first channel of the plurality of channels, and select the second processed signal for a second channel of the plurality of channels, and the first channel and the second channel have largest difference in channel quality.

(Supplementary note 25) The equalization apparatus according to Supplementary note 24, further comprising a second multi-selecting means, wherein the processing means includes a receiving processing means, the second multi-selecting means is configured to select, for the receiving processing means, the first processed signal after propagating through the first channel and the second processed signal after propagating through the second channel, the receiving processing means is configured to restore the first processed signal and the second processed signal selected by the second multi-selecting means to the first data and the second data, using a fourth transfer matrix as the transfer function, and the fourth transfer matrix is an inverse matrix of the third transfer matrix.

(Supplementary note 26) The equalization method according to Supplementary note 16, wherein the generating of the coefficient includes measuring channel quality of each of the plurality of channels, and the performing of the process associated with the signal includes processing data to be transmitted through channels having largest difference in the channel quality in such a way as to give more signal power to a channel with lower channel quality.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from international application No. PCT/JP2021/022600, filed on Jun. 15, 2021, the disclosure of which is incorporated herein in its entirety by reference.

REFERENCE SIGNS LIST 100 equalization apparatus
110 processing unit
111 transmitting processing unit
112 receiving processing unit
120 coefficient generating unit
1000, 2000, 2001, 3000, 3001 optical transmission system
1100, 2100, 3100 transmitting processing unit
1200, 2200, 3200 receiving processing unit
1300, 2300, 3300 coefficient generating unit
1400, 2400, 3400 transmitter
1500, 2500, 3500 receiver
1600, 2600, 3600 channel monitor
1700 feedback path
2110 first selector
2210 second selector
2700, 3700 channel
3110 first multi-selector
3210 second multi-selector
3120 first optical multi-selector
3220 second optical multi-selector
What is claimed is:

1. An equalization apparatus, comprising:
at least one memory configured to store instructions; and
at least one processor configured to execute the instructions to cause the equalization apparatus to:
perform a process associated with a signal using a transfer function with a coefficient, the signal propagating through each of at least three channels; and
generate the coefficient based on channel quality information on each of the at least three channels,
process first data and second data into a first processed signal and a second processed signal using a first transfer matrix as the transfer function,
wherein a coefficient of the first transfer matrix is a coefficient that gives more signal power to a channel with a lowest channel quality among the channels selected, in such a way to reduce a difference of quality between the channel with the lowest channel quality and the channel with a highest channel quality,

wherein the first processed signal is to be transmitted through a first channel of the at least three channels,
wherein the second processed signal is to be transmitted through a second channel of the at least three channels, and
wherein one of the first channel and the second channel is the channel with the lowest channel quality, and the other is the channel with the highest channel quality.

2. The equalization apparatus according to claim 1, wherein the at least one processor is further configured to execute the instructions to cause the equalization apparatus to:
restore the first processed signal after propagating through the first channel and the second processed signal after propagating through the second channel to the first data and the second data, using a second transfer matrix as the transfer function, and
wherein the second transfer matrix is an inverse matrix of the first transfer matrix.

3. The equalization apparatus according to claim 2, wherein the at least one processor is further configured to execute the instructions to cause the equalization apparatus to:
select the first processed signal for the first channel, select the second processed signal for the second channel, and select other data for other channel of the at least three channels, and
select the first data and the second data obtained by restoring the first processed signal and the second processed signal, and select the other data propagating through the other channel.

4. An equalization apparatus, comprising:
at least one memory configured to store instructions; and
at least one processor configured to execute the instructions to cause the equalization apparatus to:
perform a process associated with a signal using a transfer function with a coefficient, the signal propagating through each of at least three channels;
generate the coefficient based on channel quality information on each of the at least three channels;
process first data and second data into a first processed signal and a second processed signal using a first transfer matrix as the transfer function,
wherein a coefficient of the first transfer matrix is a coefficient that gives more signal power to a channel with a lowest channel quality among the channels selected, in such a way to reduce a difference of quality between the channel with the lowest channel quality and the channel with a highest channel quality,
wherein the at least one processor is further configured to execute the instructions to cause the equalization apparatus to:
select the first processed signal for a first channel of the at least three channels, and select the second processed signal for a second channel of the at least three channels, and
wherein one of the first channel and the second channel is the channel with the lowest channel quality, and the other is the channel with the highest channel quality.

5. The equalization apparatus according to claim 4, wherein the at least one processor is further configured to execute the instructions to cause the equalization apparatus to:
select the first processed signal after propagating through the first channel and the second processed signal after propagating through the second channel, restore the first processed signal and the second processed signal selected to the first data and the second data, using a second transfer matrix as the transfer function, and wherein the second transfer matrix is an inverse matrix of the first transfer matrix.

6. An equalization method, comprising:

performing a process associated with a signal using a transfer function with a coefficient, the signal propagating through each of at least three channels; and generating the coefficient based on channel quality information on each of the at least three channels, wherein the generating of the coefficient includes measuring channel quality of each of the at least three channels, wherein a coefficient of the transfer function is a coefficient that gives more signal power to a channel with a lowest channel quality among the channels selected, in such a way to reduce a difference of quality between the channel with the lowest channel quality and the channel with a highest channel quality, and wherein the performing of the process associated with the signal includes processing data to be transmitted through channels having a difference in the channel quality between the channel with the lowest channel quality and the channel with the highest channel quality in such a way as to give more signal power to the channel with lowest channel quality.

* * * * *